Jan. 12, 1926.                                              1,569,747
C. F. HAUG
CANDY CONFECTION
Filed Dec. 21, 1923

Inventor
Charles F. Haug
By his Atty  F. H. Richards

Patented Jan. 12, 1926.

1,569,747

UNITED STATES PATENT OFFICE.

CHARLES F. HAUG, OF BROOKLYN, NEW YORK.

CANDY CONFECTION.

Application filed December 21, 1923. Serial No. 681,996.

*To all whom it may concern:*

Be it known that I, CHARLES F. HAUG, a citizen of the United States, residing in Brooklyn, in the county of Kings and State of New York, have invented certain new and useful Improvements in Candy Confections, of which the following is a specification.

This invention relates to confections in general and more particularly to candy confections which in addition to being intended for consumption may be used as display exhibits and adapted for use as ornaments such as Christmas tree ornaments, Easter exhibits and the like.

Among the objects of the present invention, it is aimed to provide a new candy confection intended for consumption and which in addition thereto may form part of a display exhibit or of an ornament for Christmas trees, or an ornament for Easter display purposes and the like, and to provide a suitable protective means for protecting the confection against the accumulation of foreign material so that its fitness for consumption will not be impaired in any way, and which protective means will, not only serve in the protecting function aforesaid, but also serve in a decorating function.

Specifically the invention contemplates the provision of a confection having an ornamental conformation such for instance as that of a bell, indicative of a metallic or glass Christmas bell or Easter bell; the provision of a wrapper of a brightly colored, sheeny, reflecting material, such for instance as a highly colored foil sheet; the provision of a staple forced through the foil and confection preferably at the position of the supporting eye of the bell, to constitute the supporting eye; and the provision of tags, labels and the like attached to said staple on which tags or labels, verses may be imprinted or on which the trade name or trade description of the candy may be imprinted.

These and other features, capabilities and advantages of the invention will appear from the subjoined detail description of one specific embodiment thereof illustrated in the accompanying drawing, in—

In the embodiment illustrated, the confection is illustrated as a candy 10, preferably of about two inches in height having a suitable body portion 11 composed, as an instance, of a cocoanut cream mixture having a chocolate covering or coating 12, and formed in the shape of a bell, indicative of a Christmas bell or an Easter bell. Of course it is understood that the present invention lends itself for use with confections having other shapes than bells, although with bells, the invention has a particular adaptation as set forth herein.

Figure 2:
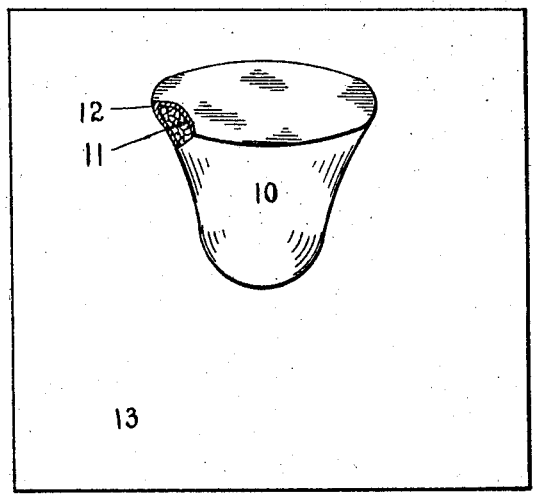
Fig. 2 is a perspective view showing the candy placed in the wrapper in position to be wrapped.

The candy is then enclosed in a wrapper 13 preferably composed of a foil such as aluminum foil or tin foil treated with bright colors such as the brilliant lavender, green and silver shades, so that the resulting wrapped confection will resemble the brightly colored metal and glass bells heretofore used in Christmas tree displays and the like. The foil wrapper is particularly adapted as a covering for this use, since it readily lends itself to be colored and treated to resemble the highly light reflecting, and brilliantly colored, Christmas bells heretofore used; and since it furthermore lends itself to be closely wrapped around the confection to conform to the exact shape of the confection produced, and to maintain such shape by reason of its inherent consistency, while at the same time protecting the confection, both against the collection of moisture or against the evaporation or dissipation of the moisture of the confection itself, and in addition thereto protects the confection against the accumulation of dust and other foreign material, and against handling when being packed for shipment, or when in display position on a Christmas tree or the like. The wrapper as illustrated in Fig. 2 preferably is rectangular in shape as it is cut in large quantities in the course of manufacture.

It will be observed that the candy confection 10 is wrapped by placing the top of the bell medially of the sheet 13 and folding the free edges of the sheet over on the bottom of the bell. This way of wrapping the confection is particularly valuable in that when it is desired to strip the wrapper away from the confection, it may be peeled down toward the top of the bell, whereby an apron will be provided adapted to catch any fragments which may fall when the bell is bitten into, and will shield the fingers of the consumer from direct contact with the confection.

Figure 3:
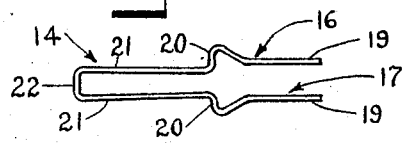
Fig. 3 is a detail view of a staple detached.

The invention also contemplates the provision of a suitable supporting means preferably a staple 14 which has two sharp prongs that may be forced through the wrapper and into the candy and thereby properly be anchored in place to form a support, by means of which a suspending cord 15 or the like may be attached to the same for the purpose of suspending the confection from a Christmas tree or the like. As illustrated in Fig. 3, the prongs 16 and 17 of the staple 14 having their free ends 19 widely spaced apart, and each provided with an outwardly extending bend 20 formed to function as a fish hook or spear head continuing in the portions 21, spaced a less distance apart than are the free ends 19, and terminating in the connecting portion or eye-forming portion 22. The bends 20 are formed, and function, similar to fish hooks, to cooperate with the widely spaced portions 19 and the less widely spaced portions 21 whereby when the staple is forced through the wrapper into the confection, the body portion of the confection will curl around and cling to the prongs while they are being forced into the confection and thus form an anchoring or abutting surface whereby to create a wedging action when a force is applied to the candy to draw the candy from the staple as in the act of suspending the candy from a Christmas tree by means of a cord attached to the staple, and thus create a sufficient resistance to secure the staple against accidental removal from the candy.

Figure 1:
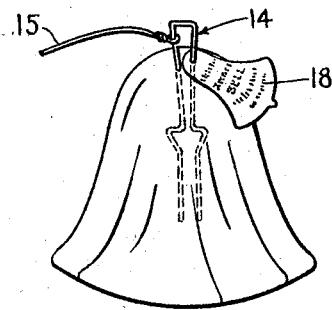
Figure 1 is a perspective view of a confection made in accordance with the present invention.

As illustrated in Fig. 1 the staple serves still a further function. A tag 18 may conveniently be attached to the confection by means of this staple, by piercing the tag and passing one leg or prong of the staple through such pierced tag and then into the confection. The facility afforded for thus attaching tags has a particular advantage in that it is difficult and impractical to produce any reading matter on a brilliantly colored foil, since the foil does not readily receive printing ink and since the wrapped article generally has portions thereof folded over as illustrated in Fig. 1, whereby part of the reading matter would be concealed and the sense of the same destroyed. Furthermore the ornamental effect of the Christmas tree ornament would be impaired if printed matter appeared on the foil. With confections of this kind it may be desirable to attach thereto appropriate verses and the like. This may be imprinted upon the label or tag, to contribute toward the ornamental effect of the resulting confection; it may also be desired to cut out the tag in an ornamental shape such for instance as a liberty bell, Christmas bell or the like as illustrated in Fig. 1. The tag of course is preferably made of a rigid, stiff paper or the like. On this tag it may also be desired to impress the trade name or trade-mark of the candy or trade description of the candy or even the price to form a price tag for purposes of display by the retailer.

With advertised articles which are sold from stands and the like it has become the custom to label each individual candy preferably by wrapping the candy in a wrapper on which the printed matter appears. Of course the ornamental effect of a Christmas tree ornament would be materially impaired if printed matter appeared on the wrapper. Therefore, in order to preserve the advantage of labeling the candy for the stand trade and the like, it is necessary to attach the printed matter in some way. Therefore, by supplying the tag 18, positively anchored to the bell by staple 14, the printed matter can conveniently be placed on the tag without in any way impairing the ornamental effect of the tree ornament.

As indicated in Fig. 2 the candy 10 is wrapped in the wrapper 13 with the upper end of the bell preferably disposed in the center of the foil wrapper and the edges of the foil bent around below the peripheral edge of the bell and folded thereunder. By this arrangement of folding, the foil can be readily pressed into engagement with the upper surface of the bell to assume the shape thereof without displaying the uneven folded edges. The staple 14, as illustrated in Fig. 1, is then passed through the wrapper into the candy at the upper end of the bell so that it will form a substitute eye for the bell in addition to forming a support for the bell as a tree ornament and to forming an anchor for the tag.

By this method of wrapping and location of the tag, when consuming the candy, the candy can be supported by the fingers of the user engaging the staple while the foil is folded back somewhat similar to the method in which lolly pops are supported by a stick and the paper folded away when it is sought to consume the candy of the lolly pop.

Of course it is understood that applicant does not here attempt to claim as his invention a foil covered candy, broadly. The invention resides mainly in combining the several elements aforesaid to form a suitable display ornament out of a candy confection without in any way impairing its fitness for consumption.

I claim:

1. The combination with a candy confection having an ornamental form, of a wrapper of brilliantly colored, highly light reflecting foil wrapped around said confection with the edges thereof protruding beneath the confection and folded thereunder, the foil wrapper being pressed into engagement with the confection to assume the shape thereof, and a supporting staple having two prongs forced through the wrapper and into the confection to form a support therefor.

2. The combination with a candy confection having the form of a bell, of a wrapper of brilliantly colored, highly light reflecting foil wrapped around said confection with the edges thereof protruding beneath the outer peripheral edge of the bell and folded thereunder, the foil wrapper being pressed into engagement with the upper surface of the confection to assume the shape of a bell, and a supporting staple having two prongs forced through the wrapper and into the confection at the upper end thereof to form an eye for the bell and a support for the confection.

CHARLES F. HAUG.